US012596608B2

(12) United States Patent
Capri et al.

(10) Patent No.: US 12,596,608 B2
(45) Date of Patent: Apr. 7, 2026

(54) ROW MAPPING IN A MEMORY CONTROLLER

(71) Applicant: Micron Technology, Inc., Boise, ID (US)

(72) Inventors: Antonino Capri, Bergamo (IT); John Namkung, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/777,453

(22) Filed: Jul. 18, 2024

(65) Prior Publication Data
US 2025/0068520 A1 Feb. 27, 2025

Related U.S. Application Data

(60) Provisional application No. 63/534,736, filed on Aug. 25, 2023.

(51) Int. Cl.
*G06F 11/07* (2006.01)
*G06F 11/20* (2006.01)

(52) U.S. Cl.
CPC ........ *G06F 11/0793* (2013.01); *G06F 11/073* (2013.01); *G06F 11/2094* (2013.01)

(58) Field of Classification Search
CPC .............. G06F 11/0793; G06F 11/073; G06F 11/2094; G11C 16/3418; G11C 2211/4063; G11C 2211/4065
See application file for complete search history.

(56) References Cited

U.S. PATENT DOCUMENTS

| | | | | |
|---|---|---|---|---|
| 6,418,068 B1 * | 7/2002 | Raynham | ............... | G11C 29/76 |
| | | | | 714/E11.034 |
| 10,311,936 B2 * | 6/2019 | Kang | ................ | G11C 11/40615 |
| 11,272,005 B1 * | 3/2022 | Blaszka | ................ | H04L 67/34 |
| 11,646,095 B2 | 5/2023 | Howe et al. | | |
| 2013/0097456 A1 * | 4/2013 | Drucker | .................. | G06F 11/20 |
| | | | | 714/E11.073 |
| 2020/0151070 A1 * | 5/2020 | Lee | ......................... | G11C 29/42 |
| 2022/0293207 A1 * | 9/2022 | Benedict | ............ | G11C 29/4401 |
| 2022/0326860 A1 * | 10/2022 | Li | ........................ | G06F 11/1666 |
| 2023/0153140 A1 * | 5/2023 | Pfefferle | ............ | G06F 9/45558 |
| | | | | 718/1 |

(Continued)

OTHER PUBLICATIONS

"Managing I/O queues", Microsoft, Dec. 14, 2021, https://learn.microsoft.com/en-us/windows-hardware/drivers/wdf/managing-i-o-queues (Year: 2021).*

(Continued)

*Primary Examiner* — Ashish Thomas
*Assistant Examiner* — Catherine Marie Nguyen
(74) *Attorney, Agent, or Firm* — Brooks, Cameron & Huebsch, PLLC

(57) ABSTRACT

A row can be mapped to a spare row in memory. The mapping can include stopping the scheduler from issuing commands to the first bank. Responsive to stopping the scheduler from issuing commands to the first bank, the logic can map a particular row of the first bank to the spare row. The mapping can include allowing the scheduler to schedule commands for the second bank concurrently with the mapping of the particular row to the spare row.

20 Claims, 8 Drawing Sheets

(56) References Cited

U.S. PATENT DOCUMENTS

| | | | | |
|---|---|---|---|---|
| 2024/0053924 A1* | 2/2024 | Sandeep | ............. | G06F 12/0246 |
| 2024/0079078 A1* | 3/2024 | Ku | .................... | G11C 29/4401 |

OTHER PUBLICATIONS

Randall Rooney, et al., "Micron DDR5 SDRAM: New Features",
Micron White Paper, retrieved from the Internet on May 22, 2023,
https://media-www.micron.com/-/media/client/global/documents/
products/white-paper/ddr5_new_features_white_paper.pdf?rev=
b98f4977d9334b4aa5d0d211a92bf14a, 6 pages.

* cited by examiner

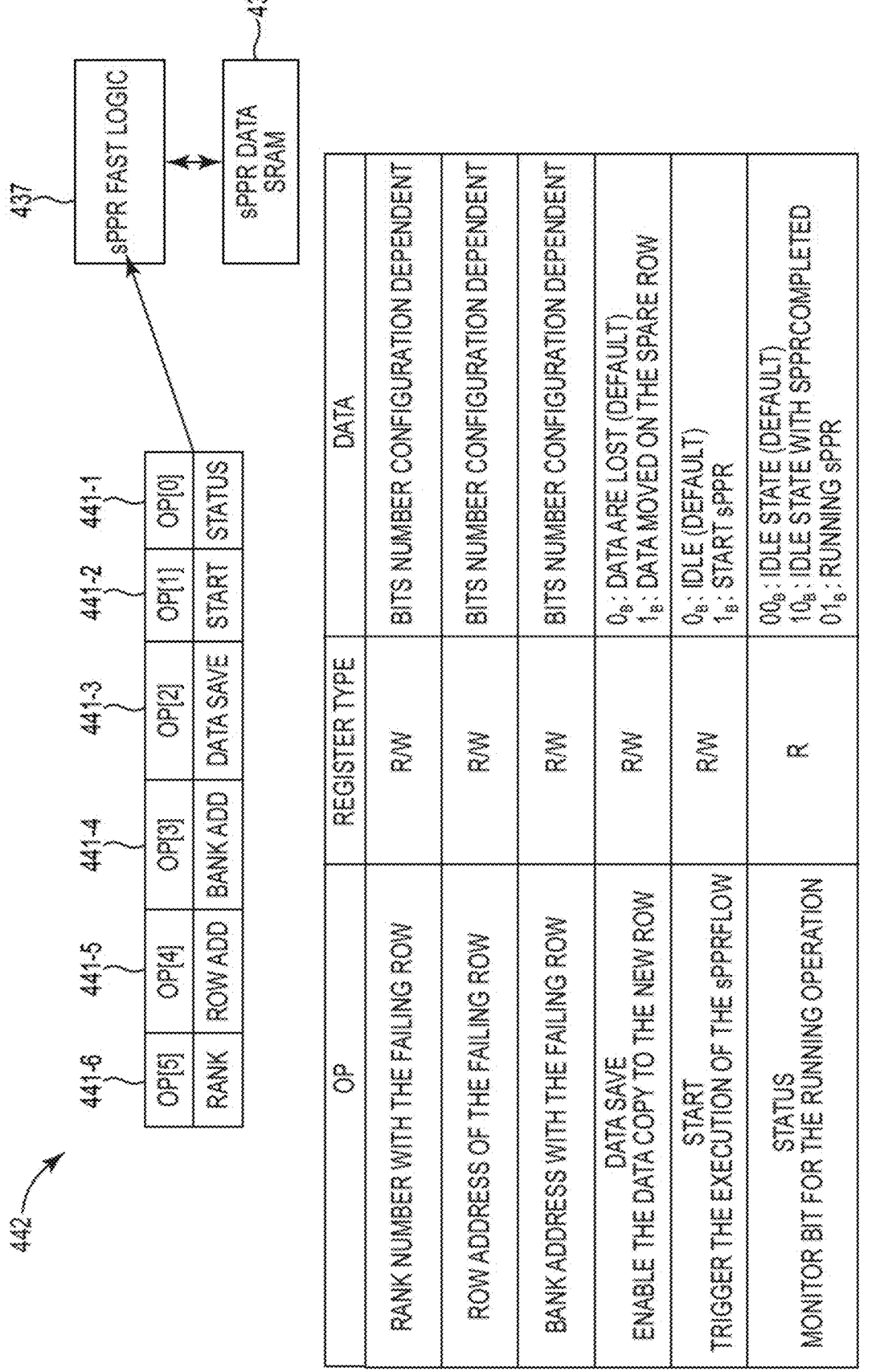

| OP | REGISTER TYPE | DATA |
|---|---|---|
| RANK NUMBER WITH THE FAILING ROW | R/W | BITS NUMBER CONFIGURATION DEPENDENT |
| ROW ADDRESS OF THE FAILING ROW | R/W | BITS NUMBER CONFIGURATION DEPENDENT |
| BANK ADDRESS WITH THE FAILING ROW | R/W | BITS NUMBER CONFIGURATION DEPENDENT |
| DATA SAVE<br>ENABLE THE DATA COPY TO THE NEW ROW | R/W | $0_B$: DATA ARE LOST (DEFAULT)<br>$1_B$: DATA MOVED ON THE SPARE ROW |
| START<br>TRIGGER THE EXECUTION OF THE sPPRFLOW | R/W | $0_B$: IDLE (DEFAULT)<br>$1_B$: START sPPR |
| STATUS<br>MONITOR BIT FOR THE RUNNING OPERATION | R | $00_B$: IDLE STATE (DEFAULT)<br>$10_B$: IDLE STATE WITH SPPRCOMPLETED<br>$01_B$: RUNNING sPPR |

Fig. 4

Figure 5:
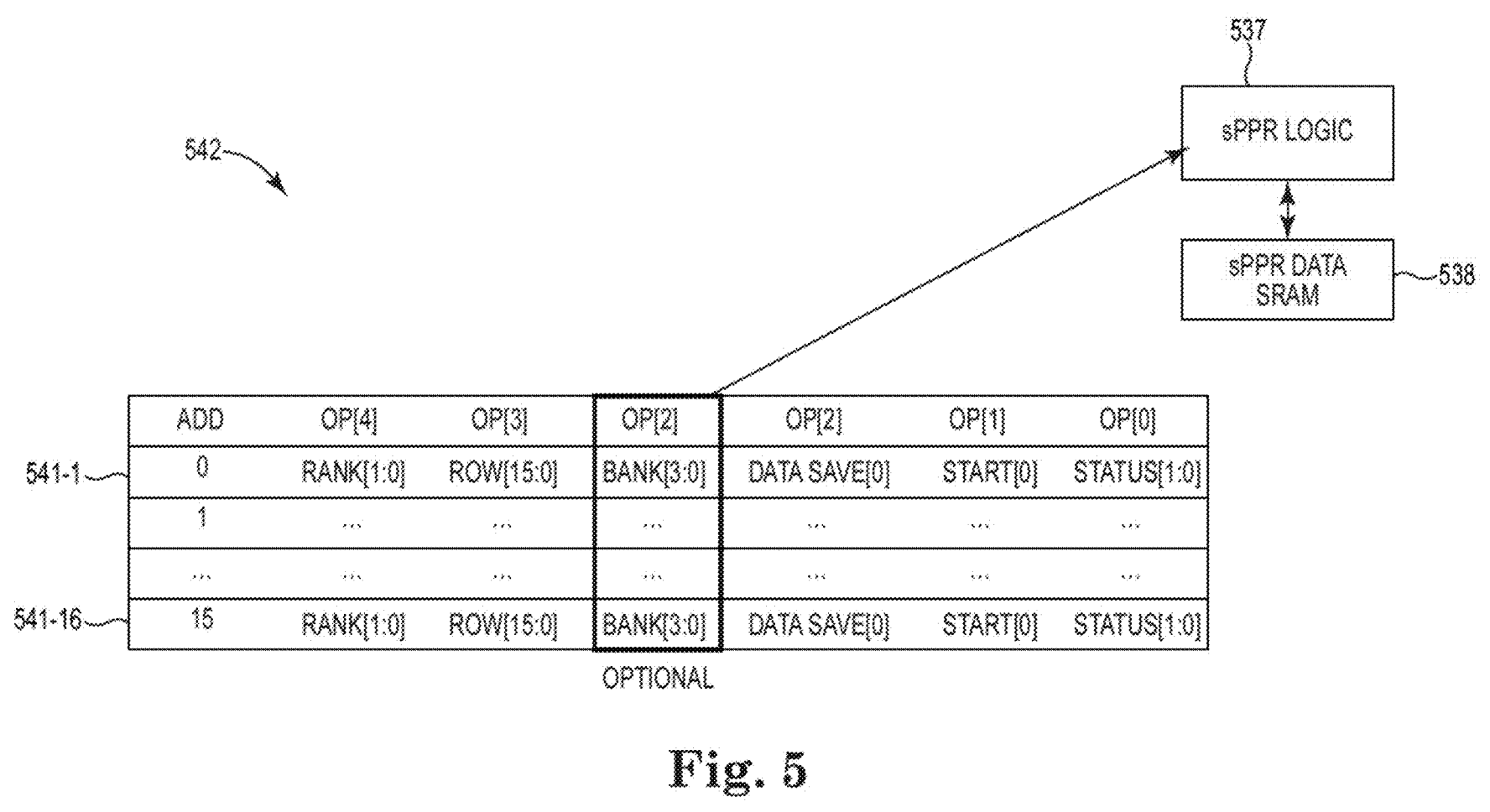

537 — sPPR LOGIC

538 — sPPR DATA SRAM

542

| ADD | OP[4] | OP[3] | OP[2] | OP[2] | OP[1] | OP[0] |
|---|---|---|---|---|---|---|
| 0 | RANK[1:0] | ROW[15:0] | BANK[3:0] | DATA SAVE[0] | START[0] | STATUS[1:0] |
| 1 | ... | ... | ... | ... | ... | ... |
| ... | ... | ... | ... | ... | ... | ... |
| 15 | RANK[1:0] | ROW[15:0] | BANK[3:0] | DATA SAVE[0] | START[0] | STATUS[1:0] |

OPTIONAL 541-1

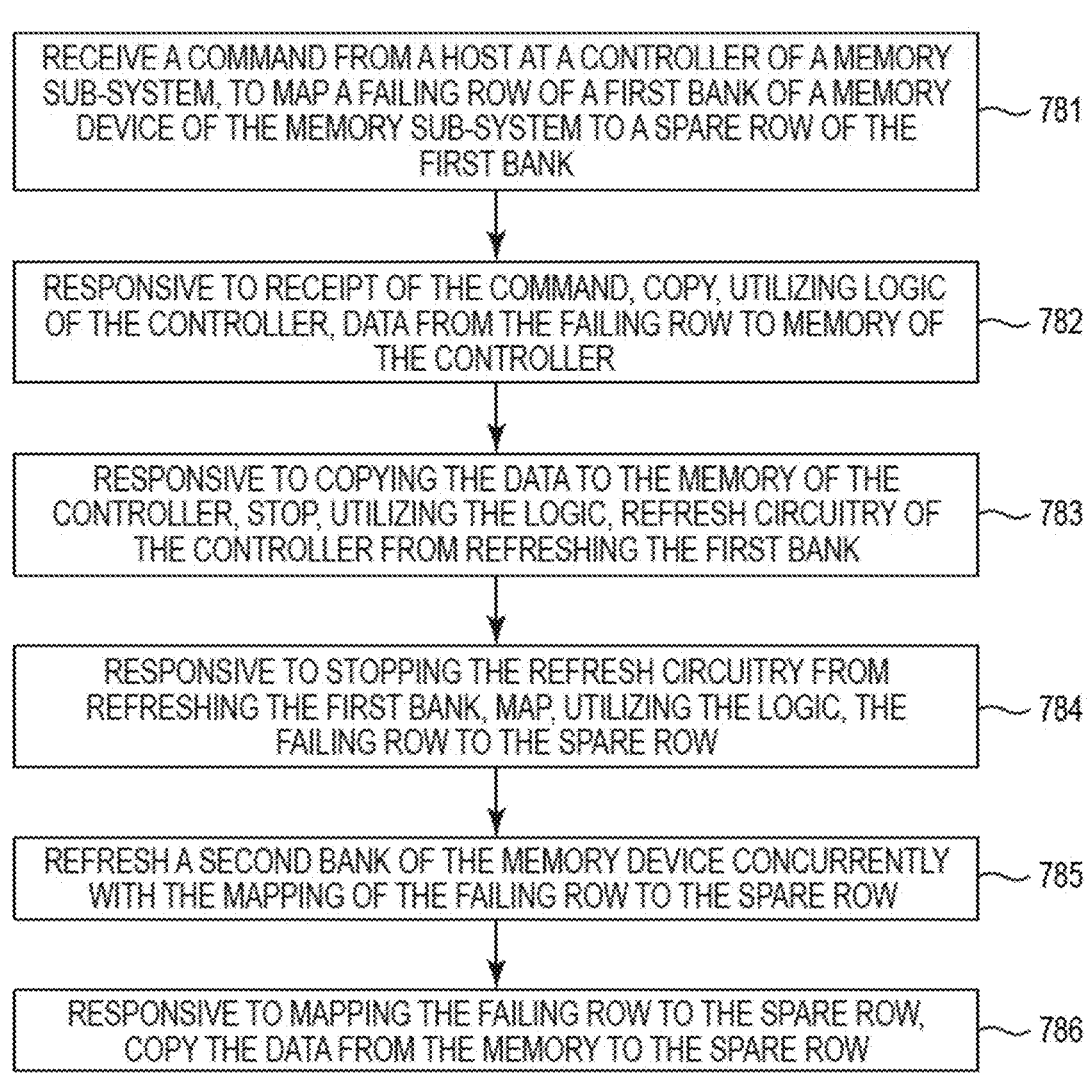

RECEIVE A COMMAND FROM A HOST AT A CONTROLLER OF A MEMORY SUB-SYSTEM, TO MAP A FAILING ROW OF A FIRST BANK OF A MEMORY DEVICE OF THE MEMORY SUB-SYSTEM TO A SPARE ROW OF THE FIRST BANK ~781

RESPONSIVE TO RECEIPT OF THE COMMAND, COPY, UTILIZING LOGIC OF THE CONTROLLER, DATA FROM THE FAILING ROW TO MEMORY OF THE CONTROLLER ~782

RESPONSIVE TO COPYING THE DATA TO THE MEMORY OF THE CONTROLLER, STOP, UTILIZING THE LOGIC, REFRESH CIRCUITRY OF THE CONTROLLER FROM REFRESHING THE FIRST BANK ~783

RESPONSIVE TO STOPPING THE REFRESH CIRCUITRY FROM REFRESHING THE FIRST BANK, MAP, UTILIZING THE LOGIC, THE FAILING ROW TO THE SPARE ROW ~784

REFRESH A SECOND BANK OF THE MEMORY DEVICE CONCURRENTLY WITH THE MAPPING OF THE FAILING ROW TO THE SPARE ROW ~785

RESPONSIVE TO MAPPING THE FAILING ROW TO THE SPARE ROW, COPY THE DATA FROM THE MEMORY TO THE SPARE ROW ~786

Fig. 7

ROW MAPPING IN A MEMORY CONTROLLER

PRIORITY INFORMATION

This application claims the benefit of U.S. Provisional Application No. 63/534,736, filed on Aug. 25, 2023, the contents of which are incorporated herein by reference.

TECHNICAL FIELD

The present disclosure relates generally to memory, and more particularly to apparatuses and methods associated with mapping rows in a memory controller.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications, including, but not limited to personal computers, portable memory sticks, digital cameras, cellular telephones, portable music players such as MP3 players, movie players, and other electronic devices. Memory cells can be arranged into arrays, with the arrays being used in memory devices. The memory can repair rows of the array when the rows fail.

BRIEF DESCRIPTION OF THE DRAWINGS

FIG. 4 is a block diagram of an interface protocol in accordance with a number of embodiments of the present disclosure.

FIG. 5 is a block diagram of an interface protocol in accordance with a number of embodiments of the present disclosure.

FIG. 7 illustrates an example flow diagram of a method for mapping a row to a spare row in accordance with a number of embodiments of the present disclosure.

DETAILED DESCRIPTION

Figure 1:
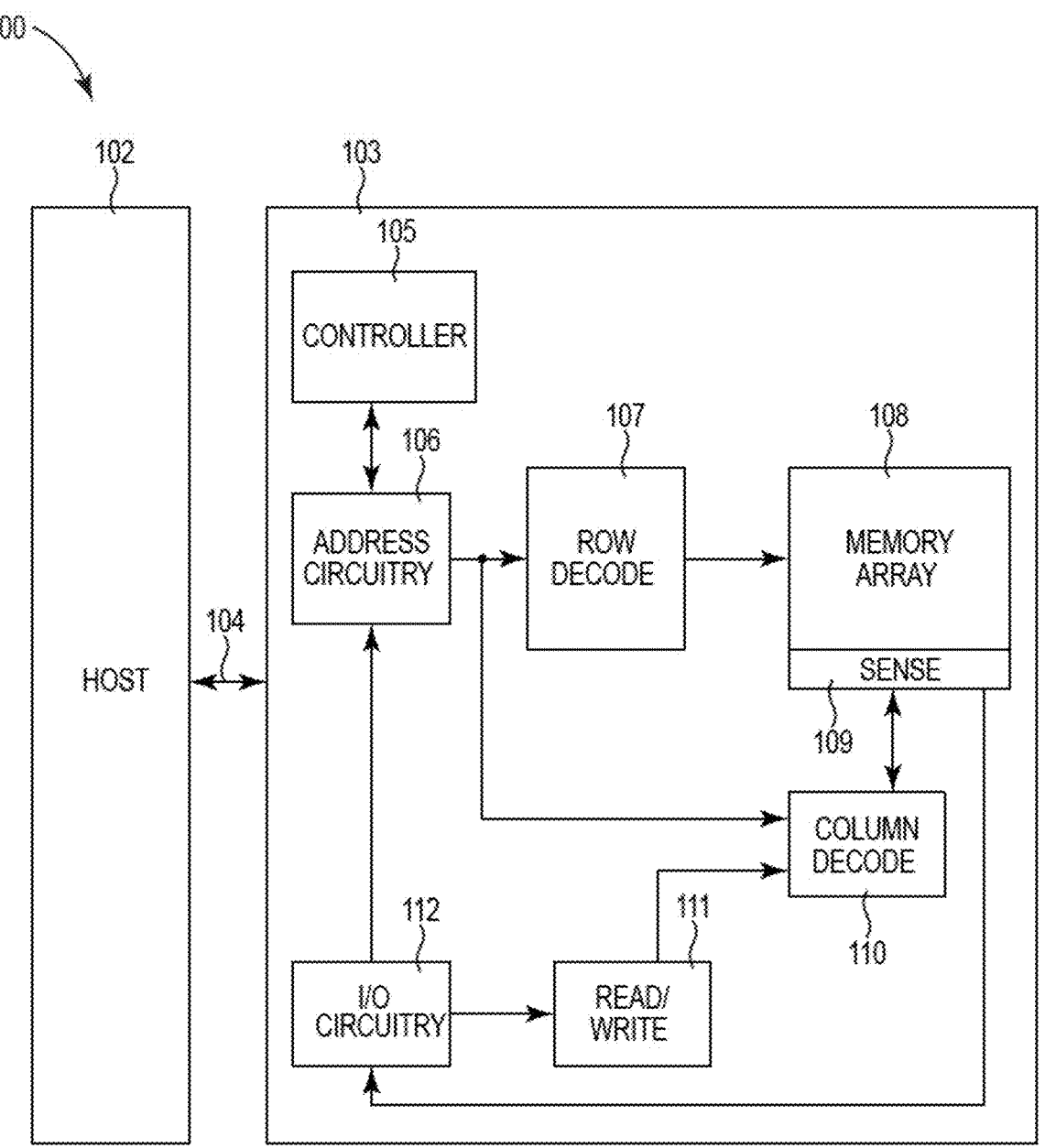
FIG. 1 is a block diagram of an apparatus in the form of a computing system including a memory sub-system in accordance with a number of embodiments of the present disclosure.

The present disclosure includes apparatuses and methods related to mapping rows in a memory controller. Rows can be mapped by stopping a scheduler of a controller of a memory sub-system from issuing commands to a selected bank of the memory sub-system. Responsive to stopping the scheduler from issuing commands to the selected bank, logic of the controller can map a particular row of the bank to a spare row. The scheduler can continue to schedule commands to other banks of the memory sub-system concurrently with the mapping of the particular row to the spare row. The logic can be coupled to the scheduler to allow the logic to provide commands to the scheduler to stop the scheduler from issuing commands to the select bank executing row map changes.

Soft Post Package Repair (sPPR) is a way to quickly, but temporarily, repair one or more row addresses per bank or bank group. In contrast to Hard Post Package Repair (hPPR) which is a longer and permanent process, sPPR can be used during the normal operations and may be used to dynamically change the rows repaired as needed.

The full sPPR sequence includes different operations and/or actions to be performed on the memory device. The different operations and/or actions include locking the running operations (READ/WRITE), issuing mode register write (MRW) command, validating additional security key, if required, avoiding refresh collisions, etc. The locked operations can be resumed after the full sPPR is performed. The locked operations can also include refresh operations to all banks. Typically, performing the full sPPR is complex and stops read/write commands to all banks. Stopping read/write commands to all banks adds to the latency of executing commands received by the memory sub-system. Additionally, data is lost when rows are mapped to spare rows utilizing sPPR because the data is not copied prior to mapping to the spare rows.

Aspects of the present disclosure address the above and other deficiencies by implementing logic in the controller that performs sPPR but is connected to a scheduler and/or refresh circuitry of the controller. The connection of the logic to the controller allows for the scheduler to receive commands to stop scheduling and issuing commands to a bank that includes the row and the spare row while continuing to schedule and issue commands to other banks. The logic (e.g., mapping logic) is a hardware block that is added in new or existing memory controllers. The sPPR process can be executed by the logic in parallel to the other commands as well as the data of the row that is being repaired is retained during the repair process by moving the data to the spare row.

As used herein, a failing row is any row in a memory device that experiences a number of errors that is greater than a threshold (e.g., uncorrectable number of errors). A spare row is a row that is implemented in a bank but is not accessible from outside the memory sub-system other than through a mapping of the spare row to a different row that is accessible from outside the memory sub-system.

As used herein, "a number of" something can refer to one or more of such things. For example, a number of memory sub-systems can refer to one or more memory sub-systems. A "plurality" of something intends two or more. Additionally, designators such as "M," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory sub-system 103 in accordance with a number of embodiments of the present disclosure. As used herein, a memory sub-system 103, a memory array 108, and/or host 102, for example, might also be separately considered an "apparatus."

In this example, system 100 includes a host 102 coupled to memory sub-system 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory sub-system 103. The system 100 can include separate integrated circuits, or both the host 102 and the memory sub-system 103 can be on the same integrated circuit. For example, the host 102 may be a system controller of multiple memory sub-systems 103, with the system controller 102 providing access to the respective memory sub-systems 103 by another processing resource such as a central processing unit (CPU).

For clarity, the system 100 has been simplified to focus on features with particular relevance to the present disclosure. The memory array 108 can be a DRAM array, static random access memory (SRAM) array, spin torque transfer (STT) RAM array, PCRAM array, thyristor RAM (TRAM) array, RRAM array, NAND flash array, and/or NOR flash array, for instance. The array 108 can comprise memory cells arranged in rows coupled by access lines (which may be referred to herein as word lines or select lines) and columns coupled by sense lines (which may be referred to herein as digit lines or data lines). Although a single array 108 is shown in FIG. 1, embodiments are not so limited. For instance, memory sub-system 103 may include a number of arrays 108 (e.g., a number of banks of DRAM cells).

The memory sub-system 103 includes address circuitry 106 to latch address signals provided over an interface 104. The interface can include, for example, a physical interface employing a suitable protocol (e.g., a data bus, an address bus, and a command bus, or a combined data/address/command bus). Such protocol may be custom or proprietary, or the interface 104 may employ a standardized protocol, such as Peripheral Component Interconnect Express (PCIe), Gen-Z, CCIX, or the like. Address signals are received and decoded by a row decoder 107 and a column decoder 110 to access the memory array 108. Data can be read from memory array 108 by sensing voltage and/or current changes on the sense lines using sensing circuitry 109. The sensing circuitry 109 can comprise, for example, sense amplifiers that can read and latch a page (e.g., row) of data from the memory array 108. The I/O circuitry 112 can be used for bi-directional data communication with host 102 over the interface 104. The read/write circuitry 111 is used to write data to the memory array 108 or read data from the memory array 108. As an example, the circuitry 111 can comprise various drivers, latch circuitry, etc.

Controller 105 decodes signals provided by the host 102. These signals can include chip enable signals, write enable signals, and address latch signals that are used to control operations performed on the memory array 108, including data read, data write, and data erase operations. In various embodiments, the controller 105 is responsible for executing instructions from the host 102. The controller 105 can comprise a state machine, a sequencer, and/or some other type of control circuitry, which may be implemented in the form of hardware, firmware, or software, or any combination of the three.

The controller 105 can include logic (e.g., mapping logic) configured to map a failing row to a spare row of the memory array 108. As used herein, the memory array 108, row decoder 107, column decoder 110, and sensing circuitry 109 can also be referred to as a bank. Multiple banks can be implemented in a memory device. A non-limiting example of a memory device is a memory die, which may also be referred to as a memory chip. The memory sub-system 103 can include multiple memory devices organized in ranks such that a rank can include one or more memory devices and each memory device includes one or more banks. Each rank is made up of memory devices coupled to a same chip select. Another non-limiting example of a memory device is a collection of memory dies bonded to a common circuit board, which may be referred to as a dual in-line memory module (DIMM).

The logic can be referred to as fast sPPR logic. The fast sPPR can implement sPPR without the limitations of the traditional sPPR. The fast sPPR logic can be coupled to a command scheduler and/or refresh circuitry of the controller 105. The fast sPPR logic can provide commands to the scheduler and/or refresh circuitry to cause the scheduler and/or the refresh circuitry to refrain from scheduling and/or issuing commands to a bank that includes the failing row and the spare row. The scheduler can continue to schedule and/or issue commands for different banks. The refresh circuitry can also continue to refresh different banks.

The logic can also store the data that was stored in the failing row (or at least the data that is recoverable) in memory of the controller prior to the failing row being mapped to the spare row. Storing the data in the memory of the controller prevents the data from being lost. The data (e.g., all of the data in the failing row) can be lost if the failing row is mapped to the spare row without previously storing the data somewhere else.

The logic can map the failing row to the spare row in view of a state of registers (not shown) of the controller. The registers can be updated by the host 102. The logic can monitor the registers to determine when to map a failing row to the spare row and to determine what row (e.g., failing row) to map to the spare row. The address of the failing row can be saved in the registers. The logic can also update the registers when the mapping of the failing row to the spare row is complete. The registers can be monitored by the host 102 to determine when the mapping of the failing row to the spare row is complete.

Figure 2:
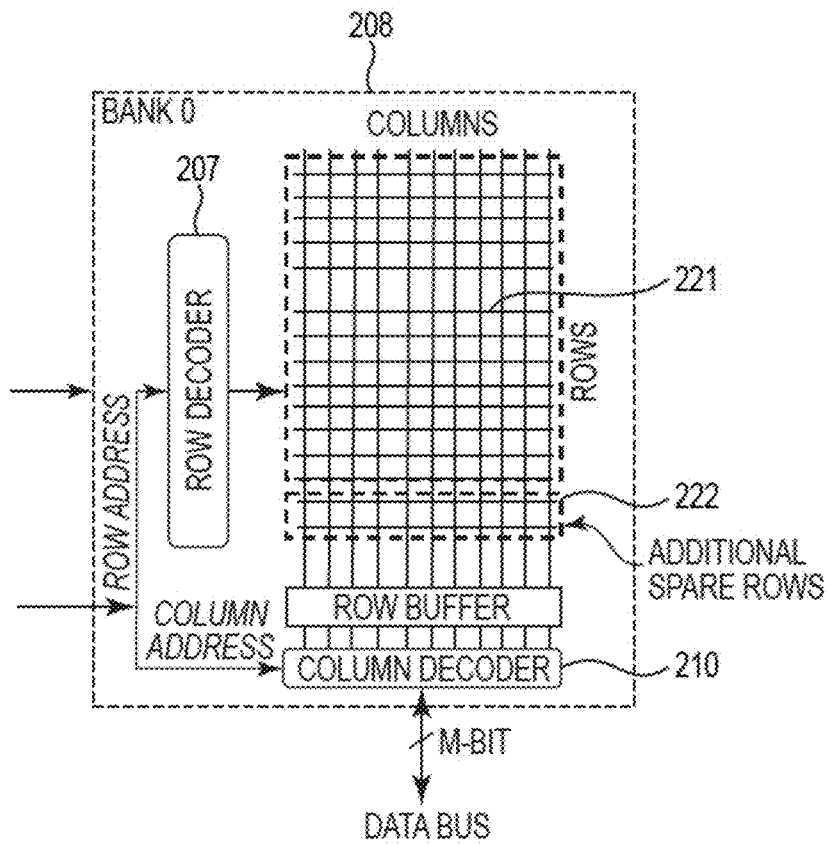
FIG. 2 is a block diagram of a bank in accordance with a number of embodiments of the present disclosure.

FIG. 2 is a block diagram of a bank 208 in accordance with a number of embodiments of the present disclosure.

The bank 208 includes a row decoder 207 and a column decoder 210. The bank 208 also includes columns and rows of memory cells.

For example, the bank 208 includes a row 221 and a spare row 222. The bank 208 can include multiple spare rows. The row 221 and the spare row 222 are different in that the row 221 is accessible from outside a memory sub-system. The spare row 222 is not accessible from outside the memory sub-system. For example, a host can provide access commands addressed to the row 221. However, the host may not know of an address of the spare row 222 and/or the controller of the memory subs-system may not schedule commands for addresses of the spare row 222. Regardless, the spare row 222 may not be directly accessed by the host. The spare row 222 can be implemented outside of the main array area while the row 221 is implemented in the main array area.

A determination can be made as to whether the row 221 is failing. One example of a manner in which the row 221 can fail if the errors experienced in accessing the row 221 over a period of time are greater than a threshold. A quantity of errors experienced in accessing the row 221 can indicate that the row 221 is not reliable.

To increase the reliability of the bank 208, the row 221 can be mapped to the spare row 222. The row 221 can be referred to as a failing row 221. Mapping the row 221 to the spare row 222 can include configuring a programmable element of the bank 208.

The programmable element of the bank 208 can store an address of the row 221 and/or a spare row 222. The programmable element can be hardware such as registers and associated logic. The programmable element can compare an address with the stored address of the row 221. If the address, corresponding to an access command, matches the stored address, then the programmable element can provide an address of the spare row 222. The address of the spare row 222 can be utilized to perform an access command on the spare row 222 and not the row 221 even though the access command was initially associated with the address of the row 221. The programmable element can be configured to cause addresses to the row 221 to be mapped to the spare row 222.

Figure 3:
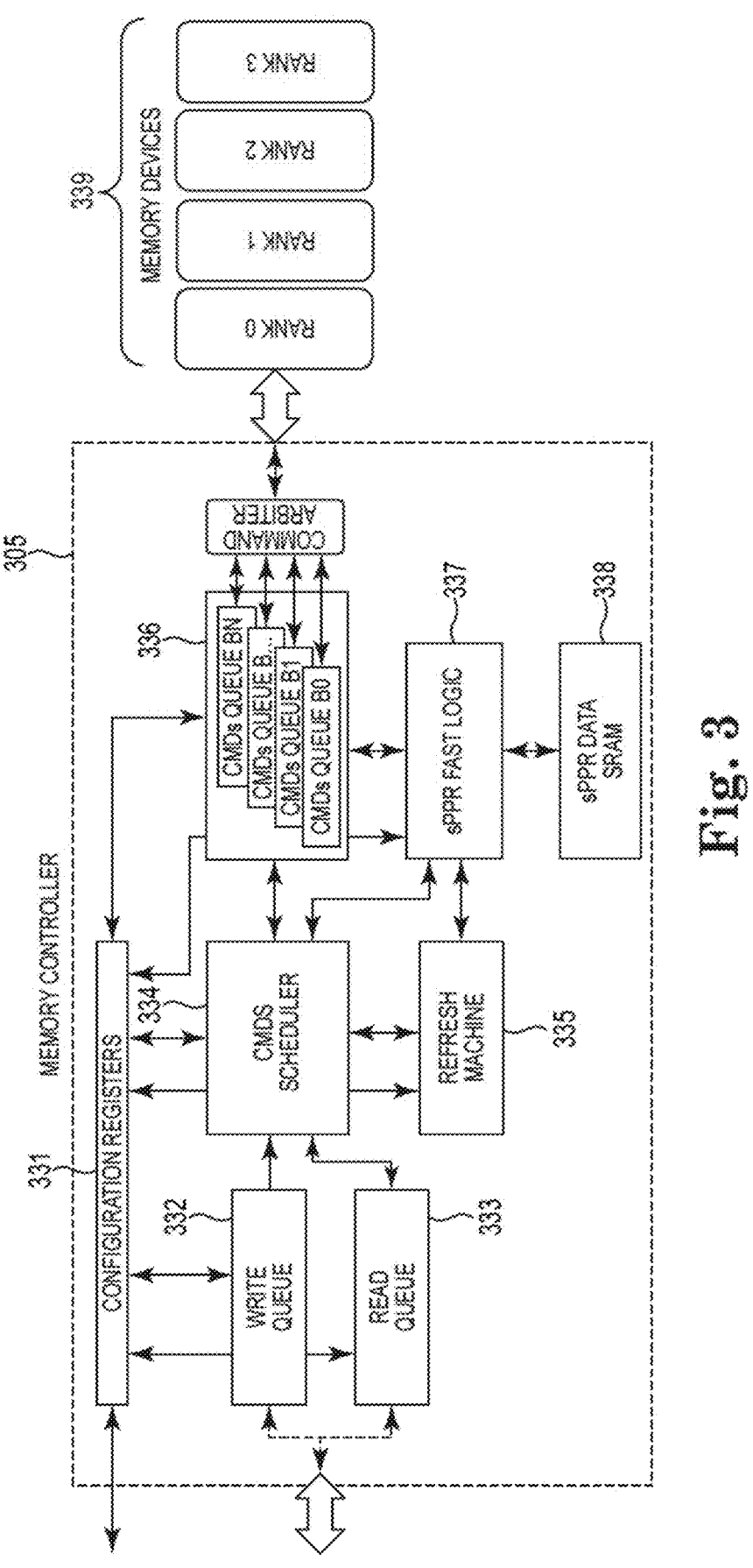
FIG. 3 is a block diagram of a controller in accordance with a number of embodiments of the present disclosure.

FIG. 3 is a block diagram of a controller 305 in accordance with a number of embodiments of the present disclosure. The controller 305 can include registers 331 (e.g., configuration registers), a write queue 332, a read queue 333, a scheduler 334, refresh circuitry 335 (e.g., refresh machine), command queues 336 (e.g., one command queue per bank), logic 337 (e.g., fast sPPR logic), and memory 338 (e.g., sPPR data SRAM). The controller 305 can be coupled to memory devices 339. The memory devices 339 can be in one or more ranks (e.g., rank 0, rank 1, rank 2, rank 3). The logic 337 and the memory 338 can be implemented as hardware and/or firmware.

In various instances, the logic 337 can include registers that are separate from the registers 331. The registers of the logic 337 are shown as registers 441 in FIG. 4. The registers of the logic 337 can be written to by a host. For example, the host can provide a command to map a row to a spare row. The command (e.g., mapping command) can be accompanied by an address of the row. The address of the row can be stored in the registers of the logic 337. For example, the controller 305 can receive the address and can store the address in the registers of the logic 337. Although the logic 337 is described as including registers (e.g., registers 441 of FIG. 4), the registers can be external to the logic 337 and separate from the registers 331.

The host can provide the command to map the row to the spare row responsive to determining that the row is failing. The host can also provide the command to map the row to the spare row for other reasons. The row can be determined to be failing due to the row experiencing a number of errors in a time period. Different types of errors on the memory array can generate column or row errors. Column errors occur when some memory cells along different rows coupled to a same column fail. A row error occurs when some memory cells along a same row fail and/or when a full row fails due to, for example, a row decoder crack.

The logic 337 can monitor the registers (e.g., registers 441 of FIG. 4) to determine whether to map a row to a spare row. The logic 337, upon noticing the row address and/or a register that indicates that a mapping is to occur, can map a row to the spare row.

For example, the logic 337 can be triggered by the writing of registers (e.g., storing of a start bit in the register 441-2 of FIG. 4) to execute a mapping of a failing row to a spare row inside the bank. The logic 337 can map the failing row, utilizing the address stored in the registers 441-4, 441-5, 441-6, to the spare row. The logic 337 can update the registers (e.g., the register 441-1) to indicate that the mapping operation is executing.

To map the row to the spare row, the logic 337 can cause data stored in the failing row to be copied (e.g., moved) to the memory 338. The memory 338 can be implemented as SRAM but is not limited to being SRAM. The memory 338 can be implemented as a different type of memory. The storing of the data in the memory 338 is optional and may not be performed based on the information stored in the registers of the logic 337. For example, the command provided by the host to cause the mapping of the row to the spare row can include an indication (e.g., as stored in register 441-3 of FIG. 4) of whether the data stored in the row is to be copied to the memory 338.

The logic 337, responsive to copying the data to the memory 338 or responsive to receipt (e.g., by the controller 305) of the command from the host, can proceed to provide signals (e.g., commands) to the scheduler 334 and/or the refresh circuitry 335 to cause the scheduler 334 and/or the refresh circuitry 335 to stop providing commands to the bank that includes the row and the spare row. The scheduler 334 can stop scheduling commands for the bank/banks depending on a memory type. The refresh circuitry 335 can stop refreshing the bank/banks depending on the memory type.

The logic 337, responsive to copying the data to the memory 338 or responsive to receipt (e.g., by the controller 305) of the command from the host, can monitor the command queues 336 to determine whether the command queues 336 are devoid of commands to the bank having the row this is being remapped. In various instances, the logic 337 can monitor a single queue from the command queues 336 to determine whether the single queue is devoid of commands to the bank. The single command queue can be the command queue associated with the bank having the row that is being remapped. The logic 337 can monitor the particular queue and not the other queues because the other queues are associated with different banks and would not have commands corresponding to the particular bank. In a different implementation, the monitoring of the queue can be demanded to the scheduler 334 with the other operations involving the bank commands. For example, the scheduler 334 can monitor the particular queue.

Responsive to blocking the scheduler 334 from scheduling commands to the bank, blocking the refreshing of the bank, and/or waiting for the command queue(s) 336 to be devoid of commands to the bank, the logic 337 can map the row to the spare row.

The logic 337 can configure the programmable element of the bank by storing an address of the row in the programmable element. The logic 337 can obtain the address of the row by reading the register (e.g., registers 441 of FIG. 4).

Responsive to mapping the row to the spare row, the logic 337 can cause the data stored in the memory 338 to be copied to the spare row. Copying the data from the row to the memory 338 and from the memory 338 to the spare row can preserve the data and can prevent the data from being lost. The data stored in the row can be lost when the row is mapped to the spare row unless the data is stored elsewhere (e.g., the memory 338).

The coupling of the logic 337 to the scheduler 334, the refresh circuitry 335, and/or the command queues 336 allows the logic 337 to prevent the particular bank from being accessed during the mapping operation (e.g., read, write, refresh, etc.). Depending on the memory type, the scheduler 334, the refresh circuitry 335, and the command queues 336 can continue to perform actions related to other commands even though they are blocked from performing an action on the particular bank that includes the row and the spare row. For example, the scheduler 334 can continue to schedule commands for different banks even through the logic 337 stopped the scheduler 334 from scheduling commands to the particular bank. The scheduler 334 can continue to schedule commands for the different banks concurrently with the mapping of the row to the spare row.

The refresh circuitry 335 can continue to refresh different banks even through the logic 337 stopped the refresh circuitry 335 from refreshing rows of the particular bank. The refresh circuitry 335 can refresh the different banks concurrently with the mapping of the row to the spare row. In various examples, based on a memory type, the refresh circuitry can postpone refresh operations until the mapping operation is completed.

The coupling of the logic 337 to the memory 338 allows the logic 337 to coordinate the copying of data stored in the row to the memory 338. Copying the data store in the row to the memory 338 allows the data to persist the mapping of the row to the spare row. Data is lost in the mapping of the row to the spare row because the row is no longer accessible. The data stored in the row is not accessible because commands to the row is mapped to the spare row.

FIG. 4 is a block diagram of an interface protocol 442 in accordance with a number of embodiments of the present disclosure. The registers 441-1, 441-2, 441-3, 441-4, 441-5, referred to as registers 441, can function as an interface between a host and the fast sPPR logic 437. The registers 441 can be operated to store data indicative of an address of the failing row.

The data stored in the registers 441 can include rank data stored in the register 441-6, row data stored in the registers 441-5, and bank data stored in the registers 441-4. The rank data, the row data, and the bank data makeup an address of the failing row. The rank data can be used to identify a rank of a bank that includes the failing row. For example, the rank data can be a rank number corresponding to a rank that includes the failing row. The host can read and/or write to the register 441-6. The rank data can be dependent on the configuration of the memory sub-system.

The row data can be used to identify the failing row. The row data can be a row address of the failing row. The host can read and/or write to the register 441-5. The row data can be dependent on the configuration of the memory subsystem.

The bank data can be used to identify a bank that includes the failing row. The bank data can be a bank address of a bank that includes the failing address. The host can read and/or write to the register 441-4. The bank data can be dependent on the configuration of the memory sub-system. The registers 441 can store multiple rank addresses, row addresses, and/or bank addresses.

The registers 441 can also store a data save bit in register 441-3, a start bit in register 441-2, and status data in register 441-1. The data save bit can be utilized to indicate to the logic 437 that data stored in the failing row is to be saved in the memory 438 prior to mapping the failing row to the spare row. A default value of the register 441-3 can indicate that no data is copied from the failing row to the spare row utilizing the memory 438. Data can be lost if the default value is stored in the register 441-3. A second value of the register 441-3 can indicate that data is to be copied from the failing row to the spare row utilizing the memory 438. The host can read and/or write to the register 441-3.

The start bit can be utilized to indicate to the logic 437 when to begin mapping the failing row the spare row (e.g., execution of the sPPR flow). Once the logic 437 begins mapping of the failing row to the spare row, the mapping of the failing row to the spare row may not be interrupted. The host can read and/or write to the register 441-2.

As used herein, the mapping of the failing row may or may not include the copying of the data stored in the failing row to the memory 438. For example, the mapping of the failing row can be performed by the logic without storing the data stored in the failing row in the memory 438. The mapping of the failing row can include the copying of the data stored in the failing row to the memory 438.

The host can provide the data stored in the registers 441. The host can provide the data as part of the command to map the failing row to a spare row or as separate signals (e.g., address information or data information associated with the command). The controller of the memory sub-system can store the data in the registers 441. The logic 437 can monitor the registers 441 to determine when to map the failing row to the spare row and to determine whether to copy the data stored in the failing row to the spare row. For example, the logic 437 can monitor the register 441-3 to monitor the data save bit to determine whether to save the data stored in the failing row to the memory 438. The logic 437 can monitor the register 441-1 to monitor the start bit to determine when to start the mapping of the failing row to the spare row.

The logic 437 can update the register 441-1 to indicate to the host when the mapping of the failing row to the spare row is complete. For example, prior to beginning the mapping of the failing row to the spare row, the register 441-1 can store a first value, which indicates to the host that a previous mapping commands was completed. Upon receive of the mapping command from the host, the controller can store a second value in the register 441-1. The controller can save the second value responsive to storing the address of the failing row in the register 441-4, 441-5, 441-6. In various instances, the logic 437 can store the second value in the register 441-1 responsive to determining that the address of the failing row has been stored in the registers 441-4, 441-5, 441-6.

After completion of the mapping of the failing row to the spare row, the logic 437 can updated the status data by storing a first value in the register 441-1. The host can monitor the register 441-1 to determine when the mapping is complete. The host can proceed to provide access commands to the failing row knowing that the access commands are mapped to the spare row.

In various examples, the host can access the data during the mapping of the failing row to the spare row. For example, if the data stored in the failing row is copied to the memory 438, then the host can access the data while the data is store din the memory 438. The host can access the data from the spare row after the data is copied from the memory 438 to the spare row. The host can access the data from the spare row when the data is not being copied to the spare row or when the data is not being copied to the memory 438. The data can be accessed from the memory 438 when the second value is stored in the register 441-3.

In various examples, a first value of the status data can be an idle state. The idle state can be used to indicate that no mapping is being performed or was previously performed. For example, the status data can have a first value after a predetermined amount of time passes since a last mapping of a failing row to a spare row. The first value can be a default value. A second value of the status data can be an idle state following the completion of a mapping. The address of the row stored in the registers 441 can be an address of the failing row that was mapped. A third value of the status data can indicate that the mapping is on-going. The host may read the status data but may not write to the register 441-1 that stores the status data.

The address of the failing row that was previously mapped can remain in the registers 441-4, 441-5, 441-6 until a next mapping is requested by the host. Retaining the address in the registers 441-4, 441-5, 441-6 allows for the logic 437, the host, and/or the controller, among other devices, to determine the last failing row that was mapped. Identifying a last mapped row can be useful, for example, to prevent multiple spare rows from being mapped to the failing row.

FIG. 5 is a block diagram of an interface protocol 542 in accordance with a number of embodiments of the present disclosure. The registers 541-1, 541-16, referred to as registers 541, store data and/or serve as an interface between a host and the fast sPPR logic 537.

Each of the registers 541 are associated with a different mapping command. For example, a host can provide a first command to map a first failing row to a first spare row. The address of the first failing row can be stored in the registers 541-1. The host can also provide a data save bit and a start bit. The data save bit and the start bit are also saved in the registers 541-1.

The host can provide a second command to map a second failing row to a second spare row. The address of the second failing row can be stored in the next registers (e.g., registers 541-2 not shown). The host can also provide a data save bit and a start bit corresponding to the second command. The data save bit and the start bit corresponding to the second command can also be saved in the next registers.

The host can provide a $16^{th}$ command to map a $16^{th}$ failing row to a $16^{th}$ second spare row. The address of the $16^{th}$ failing row can be stored in the registers 541-16. The host can also provide a data save bit and a start bit corresponding to the $16^{th}$ command. The data save bit and the start bit can be saved in the registers 541-16. Although the examples provided herein indicate 16 registers, the number of registers can be reduced or increased according to the memory type and/or the controller internal resources.

The mapping commands provided by the host can be executed by the logic 537 concurrently if the mapping commands are to different banks. For example, the first command and the second command can be executed by the logic 537 concurrently if the first command is for a first failing row in a first bank and the second command is for a second failing row in a second bank. The mapping commands can be executed concurrently if the status data corresponding to the mapping commands are set to a running value (e.g., the mapping is ongoing).

The mapping commands can be executed concurrently by the logic 537 even if some of the mapping commands are performed by copying data from the failing rows to the spare rows using the memory 538 and other of the mapping commands are performed without copying data from the failing rows to the spare rows. That mapping commands can be executed concurrently even if portions of the mapping commands are performed serially. For example, the logic 537 can map a first failing row to a first spare row at the same time that the memory 538 is storing data previously stored in a second failing row in preparation for copying the data stored in the memory 538 to the second spare row. The logic 537 can map the second failing row to the second spare row after the logic 537 is finished mapping the first failing row to the second failing row. Portions of the mapping commands can be executed concurrently even if different portions of the mapping commands are not executed concurrently.

Figure 6:
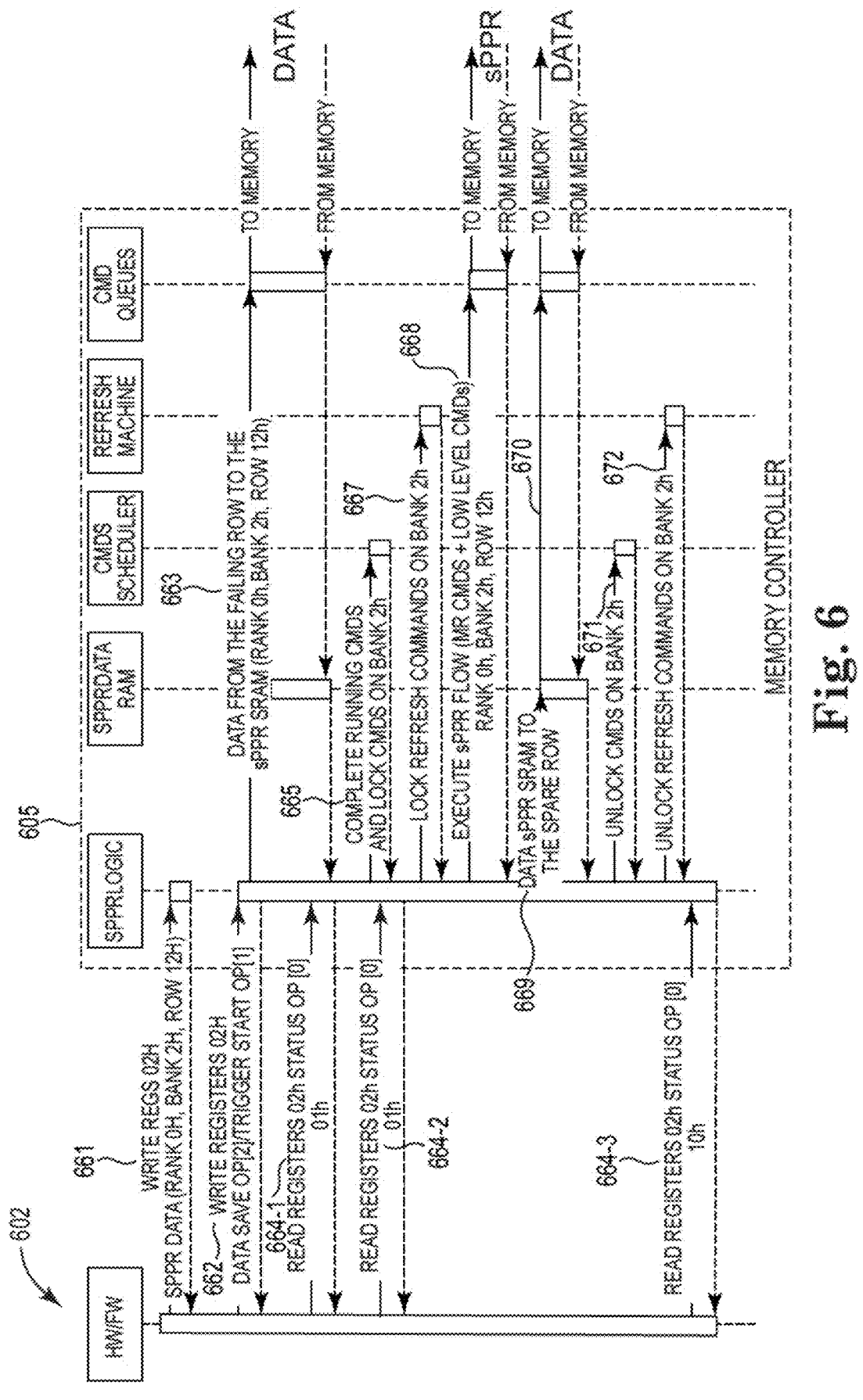
FIG. 6 is a timing diagram for mapping a row to a spare row in accordance with a number of embodiments of the present disclosure.

FIG. 6 is a timing diagram for mapping a row to a spare row in accordance with a number of embodiments of the present disclosure. A host 602 can be implemented as hardware and/or firmware. A memory sub-system can include the controller 605. The controller 605 can include logic, memory, a scheduler (e.g., CMD scheduler), refresh circuitry (e.g., refresh machine), and queues (e.g., CMD queues).

At 661, the host 602 can provide a command to the controller 605. The logic can receive the command. Responsive to receipt of the command, the logic can write an address provided with the command to registers of the controller 605 to store the address of the failing row in the registers. The logic can refrain from performing other operations because the start bit has not been set to a value that indicates that the mapping of the failing row should begin.

At 662, the host 602 can provide one or more commands to the controller 605. The logic can receive the one or more commands. Responsive to receipt of the command, the logic can store a first value in the registers that are associated with the start bit and a second value in the registers that are associated with a data save bit. For example, the host 602 can provide data that, when stored in the register cause the logic to copy the data from the filing row to the spare row and cause the logic to initiate the mapping of the failing row.

Responsive to storing the first value in the registers that are associated with the data store bit and the second value in the registers that are associated with the start bit, the logic can provide a read command to the command queues at 663. The command queues can provide the read command to a corresponding memory device to cause the failing row to be read. The data returned from the failing row can be stored in the memory of the controller.

At 664-1 and 664-2, the host 602 can provide a command to the controller 605 to cause the logic to read the status register and provide the read value to the host 602. The host can refrain from accessing the failing row responsive to reading the status register (e.g., the mapping command is not finished being executed).

At 655, after copying the data of the failing row to the memory or concurrently with copying the data of the failing row to the memory, the logic can wait for the queues to be devoid of commands to a particular bank having the failing row. After verifying that there are no commands to a particular bank in the queues, the logic can provide a command to the scheduler to cause the scheduler to refrain from scheduling commands to the particular bank. The scheduler can continue to schedule commands to other banks.

At 667, the logic can also provide a command to the refresh circuitry to prevent the refresh circuitry from refreshing the particular bank. The logic can continue to schedule commands to different banks. The logic can lock the refresh circuitry and the schedulers concurrently or sequentially. For example, the logic can cause the refresh circuitry to cease refreshing the particular bank concurrently with the locking of the scheduler to prevent the scheduler from scheduling commands to the particular bank. The logic can also cause the refresh circuitry to cease refreshing the particular bank responsive to the scheduler refraining from scheduling commands to the particular bank.

At 668, responsive to preventing the scheduler from scheduling commands to the particular bank and/or responsive to preventing the refresh circuitry from refreshing the particular bank, logic can begin mapping the failing row. For example, the logic can provide a command to the queues to cause the mapping of the failing row to the spare row.

At 669, the logic can cause the data that is stored in the memory to be copied to the spare row. For example, the logic can read the data from the memory and can provide a write command to the command queues at 670 to cause the data to be written to the spare row. The command queues can provide the write command to the appropriate memory device. The memory device can write to the spare row even through the address of the failing row was provided because the failing row has been mapped to the spare row.

At 671, the logic can unlock the scheduler. At 672, the logic can unlock the refresh circuitry. The logic can update the status but to reflect that the mapping of the failing row to the spare row is complete. At 664-3, the host 602 can read the registers of the controller 605 to read status data. The status data can indicate that the mapping is complete. The host 602, responsive to reading the status data, can provide access command to the failing row.

FIG. 7 illustrates an example flow diagram of a method 780 for mapping a row to a spare row in accordance with a number of embodiments of the present disclosure. The method can be executed by a memory sub-system of a computing system.

At 781, a command can be received from a host at a controller of a memory sub-system. The command can be provided to map a failing row of a first bank of a memory device of the memory sub-system to a spare row of the first bank. The command can be referred to as a mapping command. At 782, responsive to receipt of the command, data can be copied, utilizing logic of the controller, from the failing row to memory of the controller. The data can be copied by providing a read command to a queue corresponding to the failing row.

At 783, responsive to copying the data to the memory of the controller, the logic can stop refresh circuitry of the controller from refreshing the first bank. For example, the logic can provide a command to the refresh circuitry that causes the refresh circuitry to stop refreshing a bank that includes the failing row.

At 784, responsive to stopping the refresh circuitry from refreshing the first bank, mapping, utilizing the logic, the failing row to the spare row. The logic can provide a command to the memory device that includes the failing row to map the failing row to the spare row.

At 785, a second bank of the memory device can be refreshed concurrently with the mapping of the failing row to the spare row. For example, a fresh command to a particular bank can be store in a different queue at a same time that the queue stores a command to cause a particular bank to map the failing row to the spare row.

At 786, responsive to mapping the failing row to the spare row, the logic can copy the data from the memory to the spare row. Copying the data from the memory to the spare row makes the data available even though the failing row was mapped to the spare row.

The logic can also stop a scheduler of the controller from issuing commands to the first bank responsive to copying the data to the memory of the controller. The scheduler can schedule command and issue commands. The scheduling of commands occurs when the scheduler compiles an ordered lists of commands. The commands are issued when the scheduler provides a command to a corresponding queue or when the queue provides the command to a corresponding memory device. The failing row can be mapped to the spare row concurrently with the issuing of commands to the second bank.

A host can provide a different command from the host to copy the data from the failing row to the spare row and to start the mapping of the failing row. The different command can cause the controller and/or the logic to store copy bits in a copy register and start bits in a start register of the controller. The logic can copy the data responsive to receiving the different command.

The command can include an identifier of a rank, an identifier of a bank, and an identifier of a row. The identifier of the rank, the identifier of the bank, and the identifier of the row are an address of the failing row. The identifier of the bank can correspond to the first bank.

In a number of embodiments, a memory device, of a memory sub-system, can have a first bank and a second bank. The first bank can include a plurality of rows of memory cells and a spare row of memory cells. A controller, of the memory sub-system, can be coupled to the memory device. The controller can include a scheduler and logic coupled to the scheduler.

The logic can stop the scheduler from issuing commands to the first bank. Responsive to stopping the scheduler from issuing commands to the first bank, the logic can map a particular row of the first bank to the spare row. The logic can provide a command to the queues to cause the queues to provide the command to a particular memory device to cause the memory device to store the address of the failing row in programmable element to map the failing row to the spare row. The logic can also allow the scheduler to schedule commands for the second bank concurrently with the mapping of the particular row to the spare row.

The controller can include refresh circuitry. The logic can stop the refresh circuitry from refreshing the first bank. For example, the logic can stop the refresh circuitry from refreshing row of the first bank. The particular row can be mapped to the spare row concurrently with the refreshing of a third bank of the memory device. The refreshing circuitry and the scheduler can perform operations concurrently with the mapping of the particular row to the spare row. The operations can include refreshing and scheduling. The particular row can be mapped to the spare row concurrently with an accessing of a third bank of a different memory device. For example, the scheduler can schedule commands to a different bank of a same memory device and a different bank of a different memory device concurrent with the mapping of failing row of a particular bank of a same memory device.

In various instances, the logic can provide signals to the scheduler to stop the scheduler from issuing commands to the first bank. The signals can be commands and/or control signals. The signals can be received by the scheduler directly from the logic.

The scheduler can issue commands to access the second bank. The commands can be access commands. The access commands can be issued concurrently with the mapping of the particular row to the spare row.

The logic can map the particular row to the spare row responsive to issued commands to the first bank being completed after the scheduler is stopped. For example, the logic can wait until the commands to the first bank, in a particular queue are completed before the particular row is mapped to the spare row. The logic can wait until the queue is vacant of commands to the first bank before the logic maps the particular row to the spare row.

In various examples, an apparatus includes a scheduler, refresh circuitry, memory, and logic. The logic can be connected to the scheduler, the refresh circuitry, and the memory.

The logic can monitor a plurality of registers that store bits that identify a first failing row of a first bank and a second failing row of a second bank. The logic can, responsive to monitoring the plurality of registers, copy first data from the first failing row to the memory. The first data can be copied to the memory responsive to the host providing a particular copy data bit. The logic can, responsive to monitoring the plurality of registers, copy second data from the second failing row to the memory.

The logic can, responsive to copying the first data to the memory and the second data to the memory, stop the scheduler from issuing commands to the first bank and to the second bank. Responsive to copying the first data to the memory and the second data to the memory, the logic can stop the refresh circuitry from refreshing the first bank and the second bank. Responsive to stopping the schedules from issuing commands to the first bank and to stopping the refresh circuitry from refreshing the first bank and the second bank, the logic can map the first failing row to a first spare row of the first bank and the second failing row to a second spare row of the second bank.

The logic can allow the scheduler to schedule commands for other banks concurrently with the mapping of the first failing row to the first spare row. The logic can allow the refresh circuitry to refresh the other banks concurrently with the mapping of the second failing row to the second spare row. Responsive to mapping the first failing row to the first spare row, the logic can copy the first data from the memory to the first spare row. Responsive to mapping the second failing row to the second spare row, the logic can copy the second data from the memory to the second spare row. Responsive to receipt of a command to map the first failing row to the first spare row and the second failing row to the second spare row, set the plurality of registers. The command can be received from the host. The command can cause registers of the controller to be set.

The logic is further configured to determine to stop the scheduler and the refresh circuitry based on a register of the plurality registers being set, wherein the register is set to provide instruction to initiate the mapping of the first failed row to the first spare row. The register can store start bits.

The logic is further configured to refrain from setting a different register (e.g., status bits) of the plurality of register responsive to setting of the register, wherein a host has read access to the different register and the logic has write access to the different register. The logic does not set the different register until the mapping of the failing row to the spare row is complete. The logic can set the different register responsive to copying the first data to the first spare row and the second data to the second spare row. The logic can set the different register to signal to the host that the first failing row is mapped to the first spare row and the second failing row is mapped to the second spare row.

Figure 8:
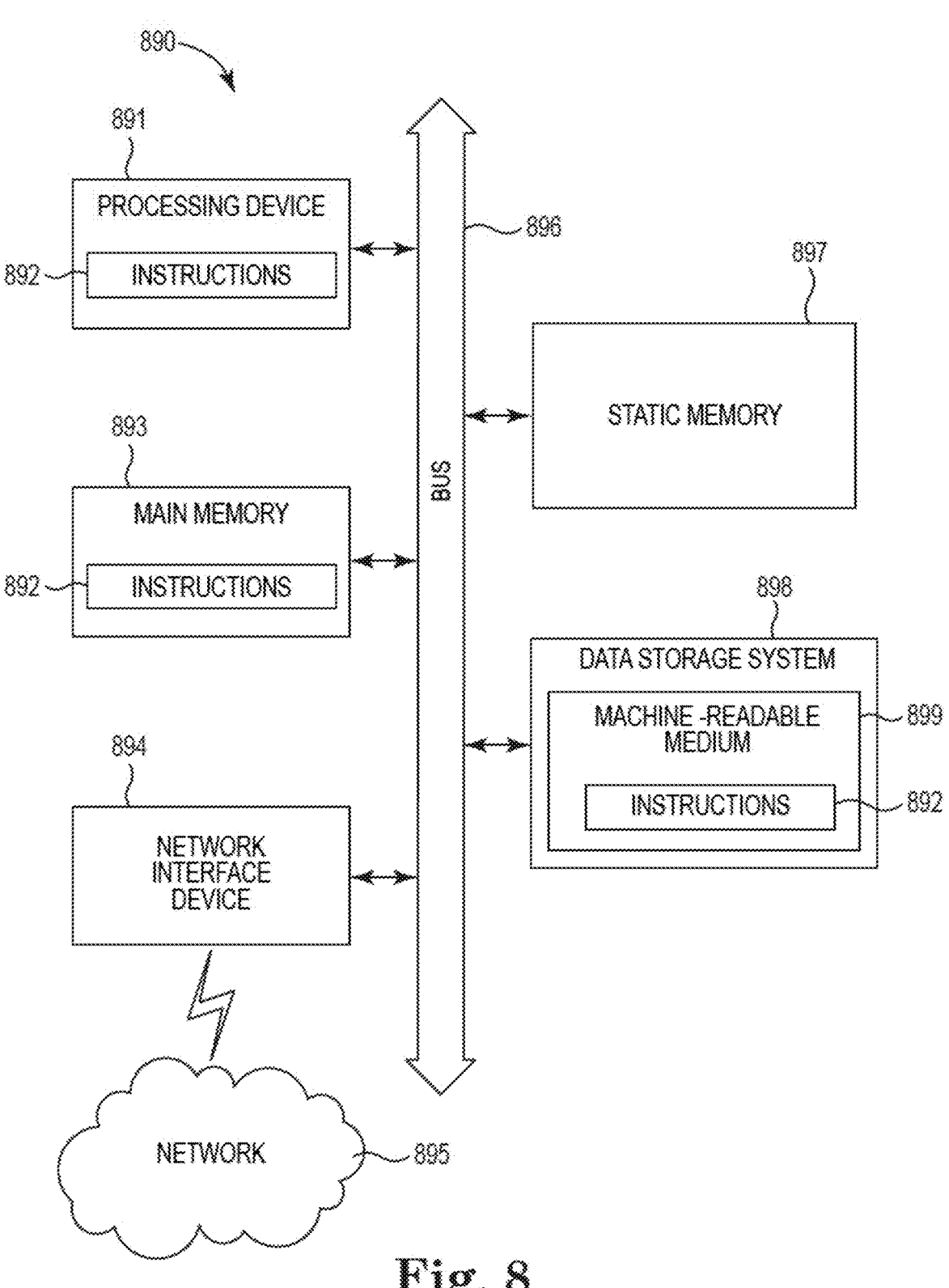
FIG. 8 illustrates an example machine of a computer system within which a set of instructions, for causing the machine to perform various methodologies discussed herein, can be executed.

FIG. 8 illustrates an example machine of a computer system 890 within which a set of instructions, for causing the machine to perform any one or more of the methodologies discussed herein, can be executed. In various embodiments, the computer system 890 can correspond to a host system (e.g., the system 102 of FIG. 1) that includes, is coupled to, or utilizes a memory sub-system (e.g., the memory sub-system 103 of FIG. 1) or can be used to perform the operations of a controller (e.g., the controller 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 890 includes a processing device 891, a main memory 893 (e.g., read-only memory (ROM), flash memory, dynamic random access memory (DRAM) such as synchronous DRAM (SDRAM) or Rambus DRAM (RDRAM), etc.), a static memory 897 (e.g., flash memory, static random access memory (SRAM), etc.), and a data storage system 898, which communicate with each other via a bus 896.

Processing device 891 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 891 can also be one or more special-purpose processing devices such as an application specific integrated circuit (ASIC), a field programmable gate array (FPGA), a digital signal processor (DSP), network processor, or the like. The processing device 891 is configured to execute instructions 892 for performing the operations and steps discussed herein. The computer system 890 can further include a network interface device 508 to communicate over the network 895.

The data storage system 898 can include a machine-readable storage medium 899 (also known as a computer-readable medium) on which is stored one or more sets of instructions 892 or software embodying any one or more of the methodologies or functions described herein. The instructions 892 can also reside, completely or at least partially, within the main memory 893 and/or within the processing device 891 during execution thereof by the computer system 890, the main memory 893 and the processing device 891 also constituting machine-readable storage media.

In one embodiment, the instructions 892 include instructions to implement functionality corresponding to the controller 105 of FIG. 1. While the machine-readable storage medium 899 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
a memory device comprising:
    a first bank of memory cells comprising a plurality of rows of memory cells and a spare row of memory cells;
    a second bank of memory cells;
a controller coupled to the memory device and comprising:
    memory;
    a scheduler; and
    logic coupled to the scheduler and configured to:
        receive a command from a host to map a particular row of the first bank of memory cells to the spare row of the first bank;

responsive to receipt of the command, copy data from the particular row to the memory;
        prevent the refresh circuitry of the controller from refreshing the first bank responsive to copying the data to the memory;
        prevent the scheduler from issuing commands to the first bank, responsive to copying the data to the memory;
        responsive to preventing the scheduler from issuing commands to the first bank and preventing the refresh circuitry from refreshing the first bank map the particular row of the first bank to the spare row; and
        allow the scheduler to schedule commands for the second bank concurrently with the mapping of the particular row to the spare row.

2. The apparatus of claim 1, wherein the controller further comprises the refresh circuitry and wherein the logic is further configured to prevent the refresh circuitry of the controller from refreshing the first bank.

3. The apparatus of claim 2, wherein the particular row is mapped to the spare row concurrently with the refreshing of a third bank of the memory device.

4. The apparatus of claim 1, wherein the logic is further configured to map the particular row to the spare row concurrently with an accessing of a third bank of a different memory device.

5. The apparatus of claim 1, wherein the logic provides signals to the scheduler to stop the scheduler from issuing commands to the first bank.

6. The apparatus of claim 1, wherein the logic is further configured to map the particular row to the spare row concurrently with the issuing of commands to access the second bank.

7. The apparatus of claim 1, wherein the logic is further configured to map the particular row to the spare row responsive to issued commands to the first bank being completed after the scheduler is stopped.

8. The apparatus of claim 1, wherein the logic is coupled to a command queue corresponding to the memory device and wherein the logic maps the particular row to the spare row responsive to the command queue being vacant of commands to the first bank.

9. A method, comprising:
receiving a command from a host at a controller of a memory sub-system, to map a failing row of a first bank of a memory device of the memory sub-system to a spare row of the first bank;
responsive to receipt of the command, copying, utilizing logic of the controller, data from the failing row to memory of the controller;
responsive to copying the data to the memory of the controller, stopping, utilizing the logic, refresh circuitry of the controller from refreshing the first bank;
responsive to stopping the refresh circuitry from refreshing the first bank, mapping, utilizing the logic, the failing row to the spare row;
refreshing a second bank of the memory device concurrently with the mapping of the failing row to the spare row; and
responsive to mapping the failing row to the spare row, copying the data from the memory to the spare row.

10. The method of claim 9, further comprising stopping, utilizing the logic, a scheduler of the controller from issuing commands to the first bank responsive to copying the data to the memory of the controller.

11. The method of claim 10, further comprising mapping the failing row to the spare row concurrently with an issuing of commands to the second bank.

12. The method of claim 9, further comprising receive a different command from the host to copy the data from the failing row to the spare row and to start the mapping of the failing row.

13. The method of claim 12, further comprising copying the data based on receipt of the different command.

14. The method of claim 9, wherein the command comprises an identifier of a rank, an identifier of a bank, and an identifier of a row, wherein the identifier of the rank, the identifier of the bank, and the identifier of the row comprise an address of the failing row, wherein the identifier of the bank corresponds to the first bank.

15. An apparatus comprising:
a scheduler;
refresh circuitry;
memory;
logic coupled to the scheduler, the refresh circuitry, and the memory and configured to:
  monitor a plurality of registers that store bits that identify a first failing row of a first bank and a second failing row of a second bank;
  responsive to monitoring the plurality of registers, copy first data from the first failing row to the memory;
  responsive to monitoring the plurality of registers, copy second data from the second failing row to the memory;
  responsive to copying the first data to the memory and the second data to the memory, stop the scheduler from issuing commands to the first bank and to the second bank;
  responsive to copying the first data to the memory and the second data to the memory, stop the refresh circuitry from refreshing the first bank and the second bank;
  responsive to stopping the scheduler from issuing commands to the first bank and to stopping the refresh circuitry from refreshing the first bank and the second bank, map the first failing row to a first spare row of the first bank and the second failing row to a second spare row of the second bank;
allow the scheduler to schedule commands for other banks concurrently with the mapping of the first failing row to the first spare row;
allow the refresh circuitry to refresh the other banks concurrently with the mapping of the second failing row to the second spare row;
responsive to mapping the first failing row to the first spare row, copy the first data from the memory to the first spare row; and
responsive to mapping the second failing row to the second spare row, copy the second data from the memory to the second spare row.

16. The apparatus of claim 15, configured to, responsive to receipt of a command to map the first failing row to the first spare row and the second failing row to the second spare row, set the plurality of registers.

17. The apparatus of claim 16, wherein the logic is further configured to read the plurality of registers to determine to copy the first data to the first spare row and the second data to the second spare row.

18. The apparatus of claim 16, wherein the logic is further configured to determine to stop the scheduler and the refresh circuitry based on a register of the plurality of registers being set, wherein the register is set to provide instruction to initiate the mapping of the first failing row to the first spare row.

19. The apparatus of claim 18, wherein the logic is further configured to refrain from setting a different register of the plurality of registers responsive to setting of the register, wherein a host has read access to the different register and the logic has write access to the different register.

20. The apparatus of claim 19, wherein the logic is further configured to set the different register responsive to copying the first data to the first spare row and the second data to the second spare row to signal to the host that the first failing row is mapped to the first spare row and the second failing row is mapped to the second spare row.

* * * * *